United States Patent Office 3,278,259
Patented Oct. 11, 1966

3,278,259
PROCESS FOR RECOVERING SbF$_3$ FROM SPENT HSbF$_6$ CATALYST
Jan M. Oelderik, Amsterdam, Netherlands, assignor to Shell Oil Company, New York, N.Y., a corporation of Delaware
No Drawing. Filed Jan. 12, 1965, Ser. No. 425,088
Claims priority, application Netherlands, Jan. 24, 1964, 6,400,597
9 Claims. (Cl. 23—88)

This invention relates to a process for the recovery of antimony fluoride from complex compounds of hexafluoroantimonic acid and hydrocarbon. In particular, the invention relates to regeneration of spent hexafluoroantimonic acid by dehydrogenative decomposition.

It has recently been discovered that hexafluoroantimonic acid (HSbF$_6$), an extremely strong acid, is a very suitable catalyst for hydrocarbon conversions. This catalyst is basically applicable where other known Friedel-Crafts catalysts have been used, but it is in general far more effective because of its highly active nature. Hexafluoroantimonic acid is at room temperature a liquid with a specific gravity of about 2.8, and is essentially insoluble in hydrocarbon. The acid can be prepared simply by adding an equal molar quantity of HF to antimony pentafluoride, which is a colorless viscous liquid at room temperature. In practice, the hexafluoroantimonic acid catalyst is generally diluted with about 5 to 10 parts HF, which enhances the activity of the catalyst and lowers its specific gravity, thereby facilitating mixing.

Because of the extreme activity of hexafluoroantimonic acid, hydrocarbon conversions such as isomerization, alkylation, polymerization, disproportionation, etc. may be carried out much more quickly or at lower temperatures than with other Friedel-Crafts catalysts. Conversion processes using hexafluoroantimonic catalysts are described in detail in Oelderik et al., U.S. Patent application Serial No. 284,806, filed June 3, 1963, now U.S. Patent 3,201,494, issued Aug. 17, 1965. As is the case with other Friedel-Crafts catalysts, hexafluoroantimonic acid is in practice subject to gradual deactivation attributable to a gradual formation of stable, catalytically inert complex compounds resulting from undesirable side reactions, such as reactions of the catalyst with intermediate products or impurities in the feedstocks. These complex compounds are insoluble in hydrocarbon and accumulate in the catalyst phase, thereby degrading the catalyst. These catalyst complexes are extremely difficult to analyze and have the appearance of a brown viscous oil, unlike other spent Friedel-Crafts catalysts which have the form of a black, tarry mass. Since the catalyst is very expensive, discarding of spent catalyst cannot be economically justified, and in many cases commercialization of a hexafluoroantimonic acid catalyzed process may depend upon the availability of an inexpensive method of regenerating spent catalyst.

Several methods of regenerating the catalyst have been attempted with limited success. The recovery of antimony-containing components from the present complex by oxidative decomposition at increased temperature leads to the formation of oxy compounds of antimony, which are very difficult to reconvert to hexafluoroantimonic acid. Attempts to hydrogenate the complexes as such or diluted with HF to produce antimony fluoride and hydrocarbon were unsuccessful and only a partial decomposition of complexes could be achieved. Complete hydrogenative decomposition of the complexes can be achieved in the presence of a tetrafluoroboric acid catalyst as described in Oelderik et al., Serial No. 396,733, filed September 15, 1964, but this process requires a high hydrogen pressure.

According to the present invention, antimony fluorides can be recovered from complex compounds of hexafluoroantimonic acid and hydrocarbon in a simple and technically attractive manner by dehydrogenative decomposition of the complexes at elevated temperature. As the complex is heated, volatile products consisting primarily of HF and low molecular weight hydrocarbons are driven off. As heating is continued, the liquid complex becomes increasingly viscous and eventually a carbonaceous residue is formed which contains substantially all of the antimony from the complex in the form of antimony trifluoride. The antimony trifluoride can be recovered from the residue substantially quantitatively by extraction, sublimation, and/or distillation, and then can easily be reconverted to hexafluoroantimonic acid.

The heat treatment of the invention is carried out at relatively low temperature, e.g., between about 150 and 350° C., preferably 175 to about 275° C. In order that the decomposition of the complex take place gradually, it is advisable to raise the temperature during decomposition relatively slowly, either continuously or stepwise. In commercial applications, it is common practice to remove a slip stream of partially deactivated catalyst. In this case it is preferred to first evaporate HF from the catalyst mixture and then to proceed with the heat treatment. As the heat treatment or pyrolysis is continued, decomposition takes place and a mixture of HF and low-molecular-weight saturated hydrocarbons generally having about 1 to 6 carbon atoms is released. The liquid complex gradually becomes more viscous and assumes a more unsaturated character. Since the antimony is still present in this viscous liquid as stable organic complexes, it is apparently not possible to recover antimony directly from the liquid. As the heat treatment is continued further, the tarry mass begins to carbonize, and the treatment is preferably continued until the carbonaceous residue has the character of a brittle, porous coke-like material. It has unexpectedly been found that essentially all of the antimony is present in this coke-like material as antimony trifluoride. The brittle coke can then be ground into smaller lumps or powder to facilitate handling and recovery of antimony trifluoride.

The duration of the heat treatment generally depends upon the rate at which the temperature is raised and on the final temperature, as well as on the stability of the complex to be decomposed. Heating times of from about 5 minutes to about 10 hours, preferably from about 15 minutes to about 2 hours, are acceptable. Since both the complex to be treated and the HF vapor released during treatments are very corrosive, the process is preferably conducted at as low a final temperature as is practicable. In general, a final heating temperature of 250° C. is sufficient to achieve complete carbonization.

A particular advantage of the process of the invention is that the heat treatment can be effected at atmospheric pressure or even under reduced pressure. In general, it is preferred to carry out the heat treatment under a slight positive pressure, maintaining the pressure by adding an inert gas such as nitrogen as necessary; any gas used to maintain the pressure should be substantially free from oxygen-containing compounds, however.

The heat treatment of the invention is appropriate for any type of hexafluoroantimonic acid/hydrocarbon complex. If the hydrocarbon radical of the complex is paraffinic in nature, decomposition can generally be effected at somewhat milder conditions than if the hydrocarbon radical contained a ring structure, formed, for example, when the hydrocarbon feed is rich in naphthenes.

Antimony trifluoride can be recovered from the carbonaceous residue by extraction, sublimation, and/or distillation. Sublimation and distillation require equipment that is sufficiently resistant to attack by fluorine-containing compounds at increased temperature, and thus are generally less desirable than extraction. The heating process can be carried out in such a manner that after decomposition is complete, the temperature is raised further, for example, above 300° C., and the antimony trifluorides sublimed or distilled away from the carbonaceous solid. The preferred method of recovery is extraction of antimony fluoride from the carbonaceous residue with a selective solvent. Suitable solvents are liquids having a relatively high solvency for antimony trifluoride and relatively low solvency for organic material which may be present in the carbonaceous product. Aliphatic alcohols and ketones are preferred solvents; simple recovery is facilitated by the use of relatively low boiling alcohols having from about 1 to 6 carbons, such as methanol, ethanol, propanol, and their mixtures, and/or ketones having 1 to 6 carbons, such as acetone, methyl ethyl ketone, and their mixtures. Alcohols are preferred to ketones since they are somewhat more selective for antimony fluoride.

Extraction can be effected by any method known to those skilled in the art. In general, extraction involves intimate mixing of the carbonaceous material with the solvent and subsequent separation of the solvent from the residue from which the antimony trifluoride has been extracted. Antimony trifluoride can then be removed from the solvent by vaporizing the solvent.

In a preferred embodiment of the process of the invention, spent hexafluoroantimonic acid catalyst is completely regenerated by converting the antimony trifluoride recovered as described above into antimony pentafluoride, and subsequently into hexafluoroantimonic acid. Antimony trifluoride recovered from the solvent is reacted with chlorine under ambient conditions to produce a mixed fluoride-chloride of pentavalent antimony ($SbF_3Cl_2$), which is converted into hexafluoroantimonic acid by the addition of liquid HF at room temperature.

A preferred embodiment of the process of the invention is envisioned as follows. Spent catalyst from a hydrocarbon conversion process, containing liquid HF as diluent, is heated in a corrosion-resistant reactor with stirring until free HF has been completely evaporated. Then the temperature is gradually raised from about 175 to about 275° C., lower molecular-weight product, such as hydrocarbons and HF, being vaporized as the decomposition proceeds. HF is separated from the recovered volatile product by cooling and is returned to the hydrocarbon conversion process. The decomposition is effected at a slight positive pressure, for example about 2 to 5 atmospheres, to permit condensation of HF and lower hydrocarbon, which separate as separate liquid layers in the condenser with the use of normally available cooling water. Non-condensibles comprising mostly methane and ethane can be returned to the process as inert gas. Heating is continued until a carbonaceous material has been formed in the reactor. After cooling, this material is crushed to a powder and is extracted with methanol or ethanol as selective solvent. After the selective solvent is evaporated from the extract phase, antimony trifluoride recovered is reacted with chlorine at ambient conditions to form a mixed fluoride-chloride of pentavalent antimony, which is subsequently reacted with liquid HF with evolution of HCl to form hexafluoroantimonic acid which is returned to the hydrocarbon conversion process.

Since the materials used in the invention are extremely corrosive, decomposition is preferably carried out in an apparatus fabricated of material which is resistant to hexafluoroantimonic acid at the specified temperatures. Suitable metals for use in the process are platinum and aluminum; suitable alloys are platinum-gold alloys, nickel-molybdenum or nickel-tungsten alloys such as the Hastelloys, and aluminum-magnesium alloys. Various synthetic materials such as polytrifluorochloroethylene (Kel-F), polytetrafluoroethylene (Teflon, Hostaflon and Fluon), and the so-called modified polymers are also acceptable.

The following examples are intended to illustrate but not to limit the invention:

EXAMPLE I

The starting material was a spent hexafluoroantimonic acid catalyst which contained free HF and catalytically inactive complexes of hexafluoroantimonic acid and hydrocarbons. Three hundred grams of this spent catalyst were introduced into a Teflon-lined stirred reactor. Free HF was removed by distillation at 80° C. and a pressure of 5 atm. absolute. A small amount of volatile hydrocarbons, such as isobutane and pentanes, formed by partial decomposition of the spent catalyst, was also released. After condensation and separation of layers of recovered volatiles, HF suitable for use as diluent for fresh hexafluoroantimonic acid was drawn off. Reactor temperature was raised stepwise, first to 110° C., then to 150° C. and finally to 180° C., during which time volatile hydrocarbons and hydrofluoric acid were continuously evolved and withdrawn from the reactor. After seven and one-half hours, 96 grams of a brittle carbonaceous mass had been formed in the reactor. This material analyzed 51.6% w. antimony and 24.5% w. fluorine, corresponding to an atomic ratio of 1:3. Antimony trifluoride, which comprised about 76% of the residue, could be recovered almost quantitatively by extraction with methanol.

EXAMPLE II

Using the procedure described in Example I, three experiments were carried out using 25 grams of the same hexafluoroantimonic acid catalyst as starting material. After free hydrofluoric acid had been distilled off, heat treatment was applied according to the invention.

The decomposition conditions and results obtained have been collected in Table I, below. At a temperature of 125° C., the decomposition residue is not yet carbonaceous but has the appearance of a sticky tar. This tar is not amenable to simple recovery of antimony trifluoride because extraction with e.g., methanol, results in dissolution of a relatively large portion of the organic material from the tar. Separation of pure antimony trifluoride from this solution would require a number of subsequent process treatments. The solubility of organic components from the carbonaceous residue is expressed in the table as the amount of material soluble in ether. Although at the final temperatures of 170° C. and 225° C. the residue still contains 28% and 8% ether-soluble product, respectively, this material is different from the material present in the tarry product; upon extraction of the two carbonaceous materials with methanol it appeared that relatively little organic material is dissolved.

*Table I*

| | | | |
|---|---|---|---|
| Duration of heat treatment, hours | 4 | 4 | 1 |
| Temperature of decomposition, ° C | 125 | 170 | 225 |
| Appearance of the residue | sticky tar | brittle coke | brittle coke |
| Ether-soluble organic material (calculated on total organic material in residue), percent w | 100 | 29 | 8 |
| $SbF_3$ formed, percent w[1] | 24 | 92 | 99 |
| Light hydrocarbons formed from total organic material present in the spent catalyst, percent w | 36 | 47 | 44 |

[1] Calculated as trivalent Sb on total Sb.

EXAMPLE III

The starting material was a spent hexafluoroantimonic acid catalyst from a plant in which a mixture of paraffins containing naphthenes was isomerized at 35° C. The spent catalyst contained 36.9% w. HF and 63.1% w. hexafluoroantimonic acid complexes in which 16.7% w. organic material was present.

Free HF was evaporated from this catalyst in a stirred Hastelloy–C reactor, and the remaining oil material was heated to 180° C. over a period of 20 minutes and was held at this temperature. Samples were taken after thirty minutes, one hour and two hours, respectively. The samples, which had a carbonaceous appearance, were extracted with methanol, and the amounts of antimony trifluoride present in the extract phases and the amounts of organic material dissolved from the carbonaceous material were determined.

Analytical results are shown in Table II. It is apparent that treatment for a period of two hours at 180° C. is not sufficient to effect complete carbonization and conversion into antimony trifluoride. The amount of antimony trifluoride increases and the amount of methanol-soluble organic material decreases as the duration of the reaction is extended. As is seen from Example I, a complete carbonization at 180° C. is attained after 7½ hours.

Table II

| | | | |
|---|---|---|---|
| Temperature of heat treatment, ° C | 180 | 180 | 180 |
| Duration of heat treatment, hours | ½ | 1 | 2 |
| SbF₃ formed, percent w | 65 | 75 | 90 |
| Carbonaceous products soluble in methanol, percent w. on total carbonaceous materiel | 8.1 | 5.4 | 5.4 |

EXAMPLE IV

The spent hexafluoroantimonic acid catalyst of Example III was used in three experiments in which the final temperatures were 160, 190 and 220° C., respectively; in all three cases the duration of heat treatment was one hour. The heat treatments were carried out in a Teflon-lined reactor. After evaporation of free hydrofluoric acid, the temperature was gradually raised; the final temperature was reached within 20 minutes. The resulting carbonaceous residues were analyzed in the same way as described in Example III.

From the results of the experiments, which have been collected in Table III, it is clear that the temperature at which the heat treatment is carried out has a great influence and that at a sufficiently high temperature, for instance 220° C., the antimony-containing components can be recovered substantially completely in the form of antimony trifluoride from a spent catalyst by a heat treatment of one hour.

Table III

| | | | |
|---|---|---|---|
| Temperature of heat treatment, ° C | 160 | 190 | 220 |
| Duration of heat treatment, hours | 1 | 1 | 1 |
| AbF₃ formed, percent w | 49.2 | 96.0 | 99.2 |
| Carbonaceous products soluble in methanol, percent w. on total carbonaceous material | 7.7 | 2.0 | 0.7 |

EXAMPLE V

Spent hexafluoroantimonic acid catalyst was subjected to a heat treatment at 225° C. for two hours, as described in Example IV. The brittle coke obtained was extracted three times at 25° C. with a total of 200% w. methanol basis coke. After evaporation of the extract phase, crystalline antimony trifluoride which contained only 0.3% w. organic material was obtained. The extracted carbonaceous material contained only 1.3% w. antimony, calculated on the original amount.

I claim as my invention:

1. A process for recovering antimony trifluoride from complex compounds of $HSbF_6$ and hydrocarbons which comprises heating the complex at a temperature of from about 150 to about 350° C. for a time of from about 5 minutes to about 10 hours such that the complex compounds are decomposed, leaving a solid carbonaceous residue, and recovering antimony trifluoride from the solid residue.

2. A process for recovering antimony trifluoride from complex compounds of $HSbF_6$ and hydrocarbons which comprises heating the complex at a temperature of from about 150 to about 350° C. for a time of from about 15 minutes to about two hours such that the complex compounds are decomposed, leaving a solid carbonaceous residue, and recovering antimony trifluoride from the solid residue.

3. A process for recovering antimony trifluoride from complex compounds of $HSbF_6$ and hydrocarbons which comprises heating the complex in the substantial absence of oxygen at a temperature of from about 150 to about 350° C. for a time of from about 5 minutes to about ten hours such that the complex compounds are decomposed, leaving a solid carbonaceous residue, and recovering antimony trifluoride from the solid residue.

4. The process of claim 3 wherein the heating is conducted for a time of from about 15 minutes to about two hours.

5. A process for recovering antimony trifluoride from complex compounds of $HSbF_6$ and hydrocarbons which comprises heating the complex at a temperature of from about 150 to about 350° C. for a time of from about 5 minutes to about 10 hours such that the complex compounds are decomposed, leaving a solid carbonaceous residue, and recovering antimony trifluoride from the solid residue by extracting with a solvent which selectively dissolves antimony trifluoride.

6. The process of claim 5 wherein the selective solvent is selected from the group consisting of aliphatic alcohols having one to six carbons and ketones having one to six carbons, and mixtures thereof.

7. The process of claim 6 wherein the selective solvent is methanol.

8. A process for regenerating spent hexafluorantimonic acid catalyst which comprises heating spent catalyst at a temperature of from 150 to about 350° C. for a time of from about 5 minutes to about 10 hours, thereby decomposing the spent catalyst and leaving a solid carbonaceous residue, extracting antimony trifluoride from the solid carbonaceous residue with a selective solvent, separating antimony trifluoride from the selective solvent, reacting the antimony trifluoride with chlorine to produce $SbF_3Cl_2$, and reacting the $SbF_3Cl_2$ thus formed with liquid HF to produce hexafluorantimonic acid.

9. The process of claim 8 wherein the spent catalyst is heated at a temperature of from 175° to 275° C.

References Cited by the Examiner

UNITED STATES PATENTS

| 1,934,943 | 11/1933 | McNary | 23—98 |
| 2,786,738 | 3/1957 | Ruh et al. | 23—88 |

OTHER REFERENCES

Simons book "Fluorine Chemistry," volume 1, 1950, page 139, Academic Press Inc., N.Y.

"The Chemistry of Fluorine and Its Inorganic Compounds," Part I, AEC–tr–3927, page 296 (Prof. I. G. Ryss).

OSCAR R. VERTIZ, *Primary Examiner.*

EDWARD STERN, *Examiners.*